(No Model.)
S. L. MORISON.
FILTER.
No. 497,807. Patented May 23, 1893.
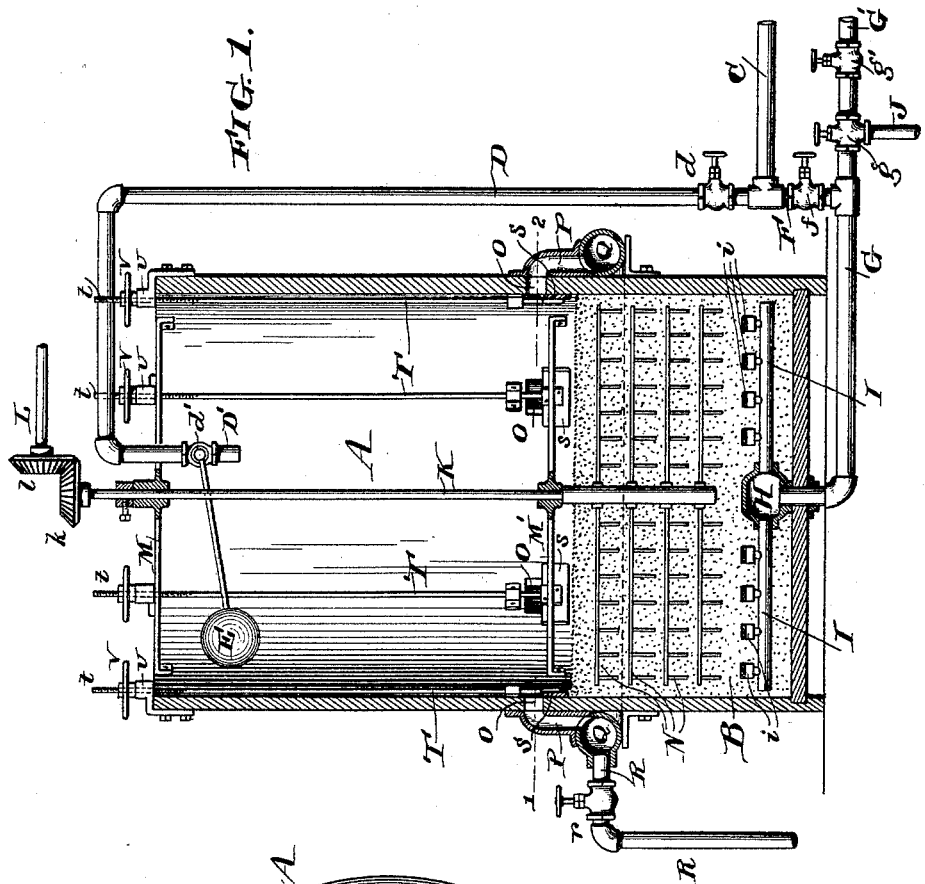
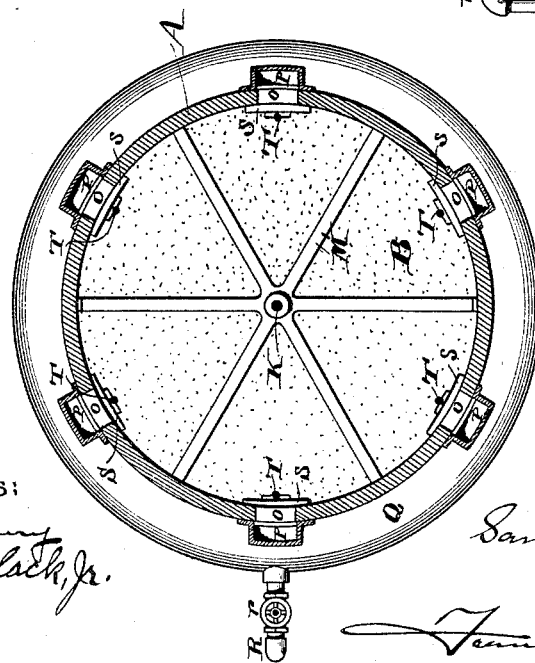
Witnesses:
Henry Drury
Joshua Matlack, Jr.
Inventor:
Samuel L. Morison
by his atty.

UNITED STATES PATENT OFFICE.

SAMUEL L. MORISON, OF NEW YORK, N. Y.

FILTER.

SPECIFICATION forming part of Letters Patent No. 497,807, dated May 23, 1893.

Application filed September 15, 1891. Serial No. 405,806. (No model.)

*To all whom it may concern:*

Be it known that I, SAMUEL L. MORISON, of the city and county of New York, State of New York, have invented a certain new and useful Improvement in Filters, of which the following is a true and exact description, reference being had to the accompanying drawings, which form a part of this specification.

My invention relates to the construction of filters and particularly though not exclusively to those filters known as gravity filters which are provided with means for washing the filter-bed by reversing the current of water passing through the same. In filters of this kind the water is admitted to the top of the tank containing the filter-bed and escapes by passing the bed of filtering material and through take-off orifices situated at the bottom of the filter-bed. A considerable body of water is allowed to accumulate in the tank above the top of the filter-bed during the process of filtering so as to increase the pressure by which the water is forced through the bed of sand or other material used for cleansing it. In washing the filter the water is forced, first, into the bottom of the filter-bed, generally through the same orifices used to take off the filtered water, and passing upward through the bed of sand or other filtering material it is drawn off above the level of the said bed carrying the impurities with it. It has been found that to effect good results in cleansing the filter-bed it is necessary that there should be little or no pressure of water on said bed and therefore it is desirable to provide orifices for the escape of the water passing upward through the bed which shall be as close as possible to the level of the top of the sand. Provision for this has been to some extent made with filters now in use but my invention is intended to provide means by which the pressure of water on the filter-bed during cleansing shall be made as small as possible.

The nature of my improved devices will be best understood as described in connection with the drawings in which they are illustrated and in which—

Figure 1 is a sectional elevation of a filter provided with my improvements; and Fig. 2 a cross-sectional plan view taken on the line 1—2 of Fig. 1.

A is the filter tank; B the filter-bed; C the water supply pipe connecting with pipes D and F the pipe D extending to the top of the filter and having a mouth D' opening into the same and the pipe F connecting with a pipe G which leads in turn to a head H situated at the bottom of the filter tank and having arms I I, &c., extending out from it, $i$ $i$, &c., being take-off nozzles extending from pipes I to the filter bed and through which water is drawn off or injected at will. The pipe G connects also with pipe G' from which leads a pipe J.

$d$ is a valve by which the pipe D can be closed, and $d'$ another valve situated near the mouth D' of said pipe and operated by means of a float E.

$f$ is a valve controlling the passage of water through the pipe F.

$g$ is a valve controlling the opening of pipe G' into the waste pipe J; and $g'$ a valve controlling the passage of water through pipe G' which is the delivery pipe of the filter.

K is a shaft journaled and supported on spiders M M' situated within the filter and operated by a driving shaft L through the miter-gears $l$ and $k$.

N N, &c., are stirring arms or rakes secured to shaft K and situated in the filter-bed.

O O, &c., is a series of openings formed in the tank close to the top of the filter bed B; preferably they are made with horizontal lower edges and of the horizontally-elongated form indicated in the drawings. By forming these exhaust passages with horizontal lower edges and making them relatively broad I am enabled to draw off the water from a lower level than would be practicable with other forms of opening. The openings O are situated symmetrically around the filter tank and each is provided with a regulating valve S operating from below upward and by which the height of the lower edge of the opening can be regulated at will. These valves are each independently operated because it will be found that to obtain the best results and nicest adjustment it will frequently be necessary to slightly vary the height of the valves or gates of the different orifices. In the plan shown they are operated by means of rods T having threaded ends $t$ upon which a threaded hand-wheel V is screwed, said wheel resting on projections U through which the rods T pass.

In order to provide for the prompt escape of water from the openings formed in the sides of the tank I provide each opening with a downwardly-extending conduit P preferably vertical but essentially with an abrupt descent. These conduits connect in turn at their lower ends with a conduit Q from which leads an escape pipe R—r being a valve by which this conduit R can be closed and by which of course the escape of water from the openings O can be regulated at will.

From what has been already said the operation of the filter can be readily followed.

In the operation of filtering the cock r is closed, the valve d' opened, the valve f closed, the valve g closed, and valve g' opened; water then passes through pipe D into tank A until the tank is filled to such a point that the float E rises to shut off the valve d' and this valve being automatically operated of course keeps the level of the water substantially uniform in the tank. The water passes through the filter-bed B into the escape nozzle i, thence through pipes I, head H, and pipe G to be delivery pipe G'. When it is desired to wash the filter the valve d is closed, the valve f opened, the valve g and g' closed, and the valve r opened; the water from pipe C then passes through pipes F, G and I and through nozzle i into the bottom of the filter-bed; thence rising through the filter-bed, which is preferably stirred up by rotating shaft K at the same time, the water escapes through the openings O and the conduits P Q and R. By means of the special constructions which I have described I greatly facilitate the escape of the water during this cleansing operation keeping its level in the tank as close to the top of the filter-bed as is compatible with preventing the escape of sand.

Having now described my invention, what I claim as new, and desire to secure by Letters Patent, is—

1. In a filter having means for washing the filter-bed by reversing the current of water passing through the same, a filter tank A having a series of openings through its sides arranged close to the level of the filter-bed in combination with a series of regulating valves S operating from below upwardly to close or partly close said openings; a conduit or conduits leading from said openings and one or more valves by which the passage of water through said conduits can be regulated at will.

2. In a filter having means for washing the filter-bed by reversing the current of water passing through the same, a filter tank A having a series of openings through its sides arranged close to the level of the filter-bed in combination with a series of conduits P P, &c., leading from each opening abruptly downward a conduit connecting the lower ends of said conduits P P, &c., said conduits P. P and the conduit uniting them being of geater area than required to drain the tank, and one or more valves by which the escape of water through the openings can be regulated at will.

3. In a filter having means for washing the filter-bed by reversing the current of water passing through the same, a filter tank A having a series of broad openings O with substantially horizontal bottom edges situated close to the level of the filter-bed; a series of conduits P P, &c. leading from each opening O abruptly downward; a conduit connecting the lower ends of conduits P P, &c., and one or more valves by which the escape of water from openings O can be regulated.

4. In a filter having means for washing the filter bed by reversing the current of water passing through the same, a filter tank A having a series of broad openings O with substantially horizontal bottom edges situated close to the level of the filter-bed; a series of upwardly-moving independent valves S S, &c, arranged to regulate the orifice of each opening O; a series of conduits P P, &c., leading from each opening O abruptly downward; a conduit Q connecting the lower ends of conduits P P, &c, and a valve r by which escape of water from conduit R and openings O can be regulated; one or more valves by which the escape of water from openings O can be regulated.

SAMUEL L. MORISON.

Witnesses:
JNO. P. GILLIS,
JOHN STOREY.